United States Patent [19]

Millman

[11] 4,280,468
[45] Jul. 28, 1981

[54] REGENERATIVE RECIPROCATING OPEN CYCLE INTERNAL COMBUSTION ENGINE

[76] Inventor: Mitchell W. Millman, 5699 Venado Ct., San Jose, Calif. 95123

[21] Appl. No.: 120,210

[22] Filed: Feb. 11, 1980

[51] Int. Cl.³ .............................................. F02M 31/08
[52] U.S. Cl. ................................. 123/546; 123/543; 123/193 CP; 123/142.5 R
[58] Field of Search .......... 123/122 AB, 141, 142.5 R, 123/143, 1 R, 30 R, 30 A, 193 P, 193 CP, 193 H, 193 CH, 191 R, 191 A, 543, 546

[56] References Cited

U.S. PATENT DOCUMENTS

| | | | |
|---|---|---|---|
| 555,087 | 2/1896 | Garnier et al. | 54/18 R |
| 1,327,384 | 1/1920 | Haessly | 123/122 AB |
| 1,340,062 | 5/1920 | Lapham | 123/141 |
| 1,540,626 | 6/1925 | Higgins | 123/30 |
| 3,648,676 | 3/1972 | Lowman, Jr. | 123/191 R |
| 3,923,011 | 12/1975 | Pfefferle | 123/1 R |
| 4,011,839 | 3/1977 | Pfefferle | 123/1 |
| 4,092,967 | 6/1978 | Hasleft | 123/191 A |

FOREIGN PATENT DOCUMENTS

| | | | |
|---|---|---|---|
| 282830 | 5/1952 | Switzerland | 123/191 R |
| 104 | of 1904 | United Kingdom | 123/30 R |

Primary Examiner—P. S. Lall
Attorney, Agent, or Firm—John L. McGannon

[57] ABSTRACT

An internal combustion engine of the open cycle type in which a porous, heat retaining regenerative member is placed in a cylinder head between the reciprocal piston and the intake and exhaust valve thereof. The regenerator member is heated to high temperatures during the exhaust cycle of the engine and preheats a fresh charge of air during the compression stroke of the engine so that, when the compressed air charge is mixed and ignited with a fuel charge, the engine's efficiency will be increased and the engine may operate at a lower compression ratio, thereby reducing heat loss to the engine. In one embodiment, the piston has means for releasably coupling the regenerator member therewith for movement with the piston during two of the strokes of the cycle of operation of the engine, the coupling and uncoupling being a function of the position of the piston in the cylinder. In a second embodiment the engine is of a low profile, side valve engine in which the regenerator member is stationary relative to the cylinder and provided with a reciprocal dam to control the air charge flow through the regenerator.

18 Claims, 12 Drawing Figures

REGENERATIVE RECIPROCATING OPEN CYCLE INTERNAL COMBUSTION ENGINE

This invention relates to improvements in internal combustion engines and, more particularly, to an internal combustion engine which has regenerative capabilities to increase the efficiency of operation of the engine.

BACKGROUND OF THE INVENTION

Internal combustion engines of conventional design are generally inefficient inasmuch as heat generated during ignition is lost to the engine block and exhaust. Moreover, relatively large amounts of emission pollutants are exhausted from such engines because of inefficient burning of the hydrocarbons in the fuel injected into the cylinders thereof. Attempts have been made in the past to increase the efficiencies of engines of this type and such attempts have not been entirely satisfactory because of design restrictions or other mechanical drawbacks which limit the compression ratios and reduction of polluting exhaust gases.

Prior U.S. Pat. Nos. relating to attempts to improve efficiencies of internal combustion engines are as follows: 555,087; 1,327,384; 3,648,676; 3,923,011 and 4,092,967.

Because of the continued desire on the part of industry to increase efficiencies of internal combustion engines, a need has arisen to provide an engine of this type which overcomes the drawbacks and failures mentioned above with respect to conventional engines of this type.

SUMMARY OF THE INVENTION

The present invention satisfies the aforesaid need by providing a regenerative reciprocating open cycle internal combustion engine in which the heat of the exhaust gases is used to heat a regenerator that is contained within the cylinder or combustion space of the engine. The regenerator is used to preheat the air charge of the next cycle after the air charge has been compressed. With this arrangement, the engine of the present invention has an efficiency significantly improved over that of current spark ignition and Diesel cycle engines.

When the regenerative cycle is optimized to provide maximum efficiency, further advantages acrue including the following: the peak pressures reached during the combustion cycle are substantially lower, such as by a factor of two to three, than those of conventional internal combustion engines, thereby reducing mechanical stresses in the engine. Also, the regenerator preheats the compressed air approximately to 2,000° F. (as compared to approximately 1,000° F. achieved during the compression stroke of Diesel engines). Thus, when fuel is injected into the air charge, it ignites with minimum delay and burns rapidly, so that low grade fuels can be used. In addition, maximum efficiency is achieved at relatively low compression ratios, approximately 5:1, so that substantial working space is available for the regenerator and other engine mechanisms. The low compression ratio allows great latitude in engine design, including a low profile side valve engine as well as an overhead valve engine. Another advantage of the regenerative engine cycle of the present invention is the potential for reduced emission of pollutants since peak cylinder pressures are substantially lower than those of Diesel engines, thereby reducing nitrous oxide production, and a lean fuel/air mixture can be used to reduce hydrocarbon and carbon monoxide production.

The primary object of this invention is to provide a regenerative cycle engine of the reciprocating internal combustion type in which the operation of the engine is achieved at greater efficiency than conventional internal combustion engines, such as spark ignition and Diesel engines, to provide greater operating economies while permitting operation at lower compression ratios and with reduced emission of pollutants from the engine.

Another object of the present invention is to provide an engine of the type described wherein a porous regenerator member is used in the engine to preheat the air charge during the compression stroke so that a greater peak pressure is reached during the combustion cycle and the compression ratios are substantially lower to thereby provide a more efficient operation of the engine and to permit great latitude in engine design notwithstanding the high efficiencies achievable with the engine.

Other objects of this invention will become apparent as the following specification progresses, references being had to the accompanying drawings for an illustration of several embodiments of the invention.

IN THE DRAWINGS

Figure 1:
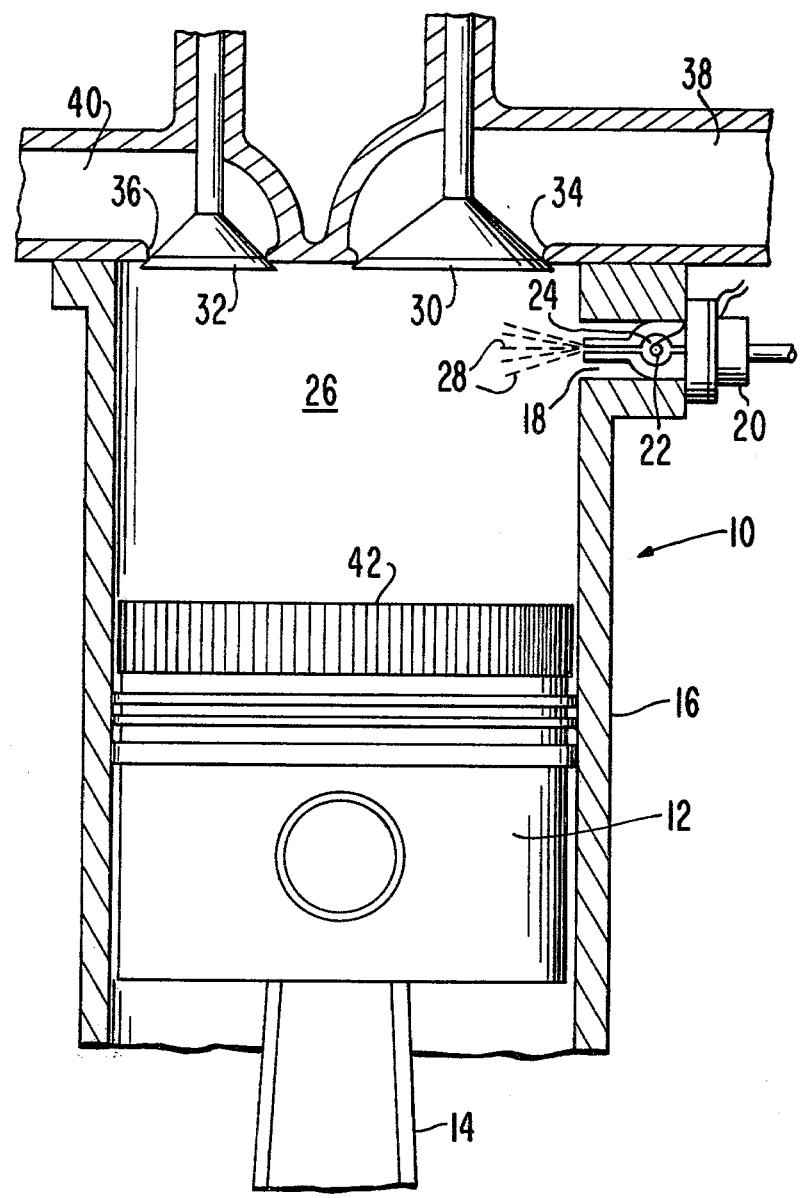
FIG. 1 is a vertical section through a piston and cylinder assembly of one embodiment of a regenerative cycle engine of the present invention showing the regenerator member therein.

A first embodiment of the regenerative cycle engine of the present invention is broadly denoted by the numeral 10 and is illustrated in FIGS. 1-8. Engine 10 includes a piston 12 having a connecting rod 14 pivotally coupled thereto in a conventional manner. The piston is mounted for reciprocation within a cylinder 16 provided with a fuel inlet passage 18 into which a fuel injector 20 is placed. Fuel injector 20 has a glow plug 22 in a prechamber 24 to supply a fuel charge to the interior 26 of cylinder 16, the injected fuel being denoted by the dashed lines 28 in FIG. 1.

Engine 10 has an intake valve 30 and an exhaust valve 32 adjacent to respective ports 34 and 36 at the inner ends of fluid passages 38 and 40, respectively. Means (not shown) is provided to reciprocate each of the valves so that it alternately opens and closes at corresponding ports.

A regenerator 42 is within interior 26 of cylinder 16 between piston 12 and valves 30 and 32. Member 42 is able to move up and down in space 26 and the member has approximately the same diameter as the inner diameter of cylinder 16 and is loosely fitted within the cylinder. Member 42 is porous and has a plurality of passages therethrough to permit the easy flow of gas therethrough. It can be of any suitable heat retaining material, such as metal screens or sheets, or ceramic tubes or layers. Member 42 must withstand the high temperatures of the exhaust gases developed during the operation of engine 10. Means hereinafter described is provided to move member 42 within space 26 for certain parts of the operating cycle of engine 10. Connecting rod 14 is connected to a crank shaft (not shown) for transmitting power to the crank shaft in the conventional manner.

The operating cycle of engine 10 will now be described with references to FIGS. 2-7.

Figure 2:
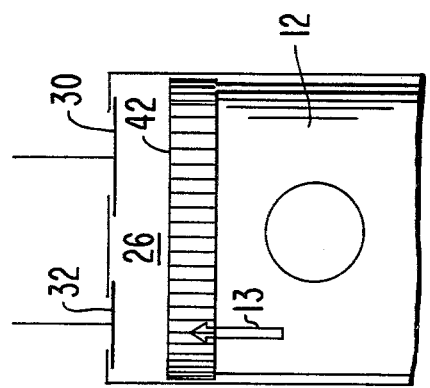
FIGS. 2-7 are schematic views of the assembly, showing the sequence of operation of the engine and the locations of the regenerator member for the various strokes of the engine.

In FIG. 2, showing the exhaust cycle, member 42 is positioned near valves 30 and 32 with valve 32 being opened for the exit of hot exhaust gases as a function of the upward movement of piston 12 within cylinder 16. The hot gases move through member 42 because of its porosity so that the member is heated to very high temperatures by the heat extracted from the exhaust gases. This heat energy is stored in member 42. Since the exhaust gases are cooled as they pass through member 42, the end of member 42 facing piston 12 will be much hotter than the end facing valves 30 and 32.

Figure 3:
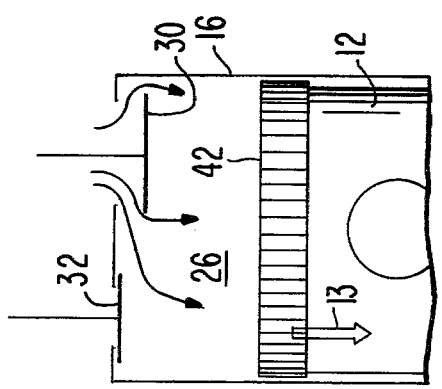

FIG. 3 shows the intake stroke of engine 10 in which piston 12 is moving in the direction of arrow 13. This stroke is commenced after piston 12 has reached its top dead center position and has expelled exhaust gases past valve 32. During this stoke, piston 12 and member 42 move away from valves 30 and 32, drawing in a fresh air charge through open intake valve 30. Member 42 remains in proximity to piston 12 during this intake stroke to minimize any heat transfer to the incoming air. At the bottom of the intake stroke, valve 30 closes.

Figure 4:
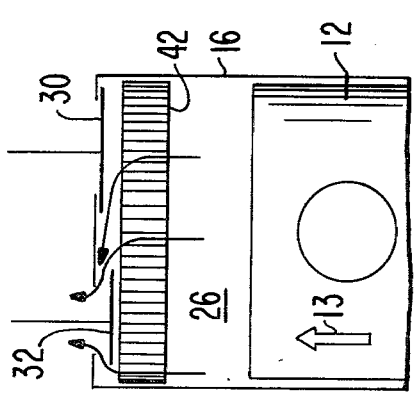

During the compression cycle as shown in FIG. 4, piston 12 moves upwardly to move member 42 toward valves 30 and 32 and to compress the air charge in the portion of space 26 between the valves and member 42.

Figure 5:
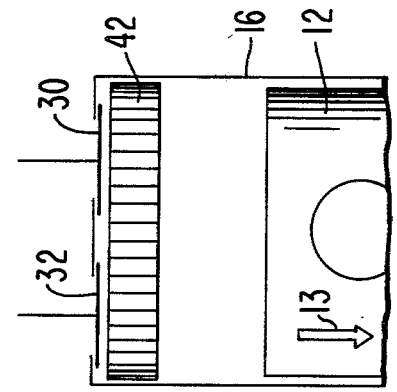

As the compression stroke continues and as piston 12 reaches top dead center as shown in FIG. 5, member 42 continues to move toward valves 30 and 32. This forces the compressed air charge through member 42 to heat the charge to a very high temperature, the heat energy stored in member 42 being transferred to the air charge. Because the temperature of the air increases, the pressure of the compressed air also increases.

Figure 6:
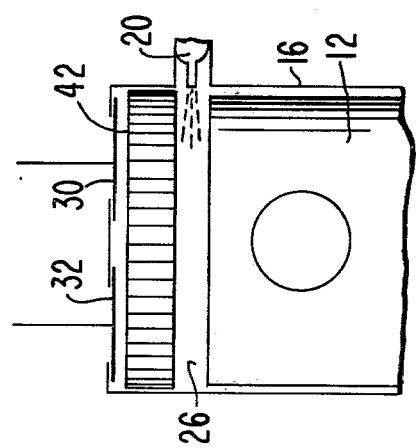

When the piston reaches top dead center as shown in FIG. 6, fuel is injected into the portion of space 26 between member 42 and the adjacent end of the piston. The fuel is then vaporized and burns in the preheated air charge with minimum delay.

Figure 7:
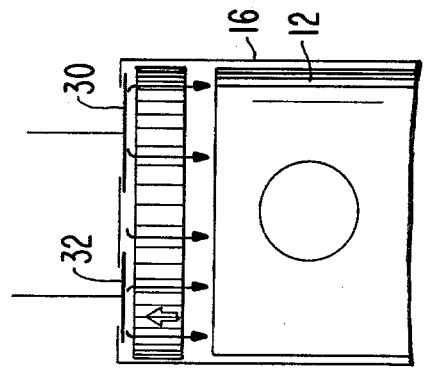

During the expansion or power stroke of engine 10 as shown in FIG. 7, the high pressure cylinder charge forces piston 12 away from regenerator 42 which remains near valves 30 and 32 so as to provide the power stroke which is transmitted to the crank shaft of the engine. After the power stroke, exhaust valve 32 opens and piston 12 commences to move upwardly in the manner shown in FIG. 2 to force hot exhaust gases through member 42 and out of cylinder 16 through valve 32 to start a new cycle of operation.

The foregoing description is somewhat idealized inasmuch as, in actual practice, the various stages of the cycle will overlap to provide a smooth operation of the engine. Engine 10 has been used in this description for purposes of illustration and the present invention is not to be limited to this description. In particular, while a fuel injector has been shown in this particular embodiment, it is evident that the regenerative cycle illustrated will also operate effectively with a carburetted engine in which a pre-mixed fuel/air mixture is drawn into the cylinder on the intake stroke. This mixture will come into contact with the hot side of member 42 and will be efficiently ignited as it passes through the regenerator.

Figure 10:
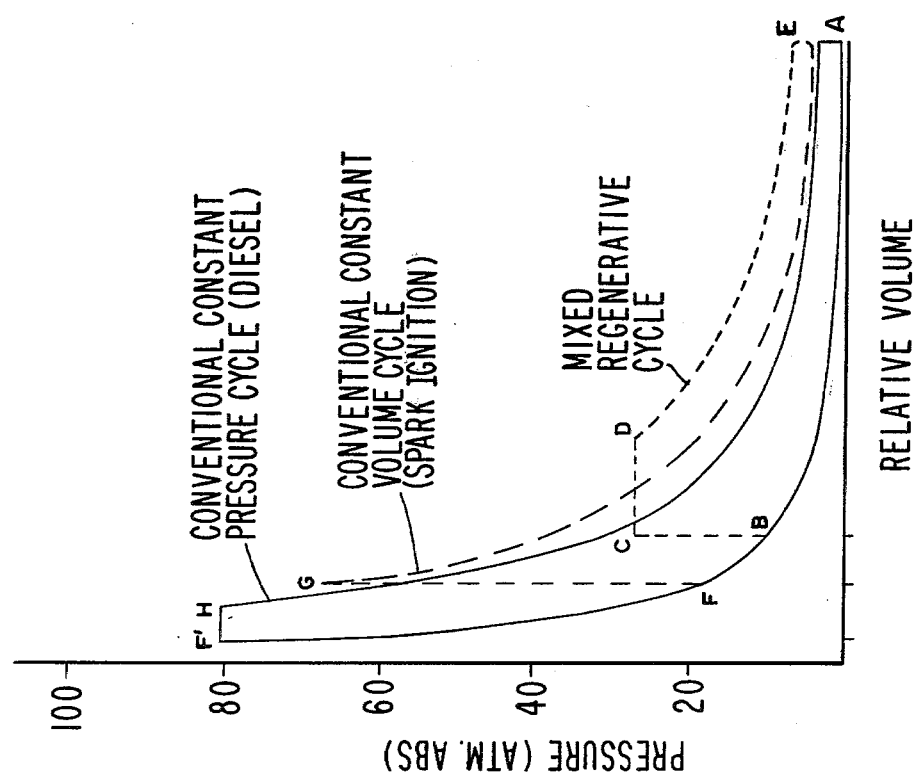
FIG. 10 is a graphic view of the pressure-volume diagram of the mixed regenerative cycle obtained from the engine of the present invention as compared with Diesel and spark ignition engine operations.

FIG. 10 illustrates the idealized pressure-volume diagram with respect to the cycle of operation of engine 10 as compared with a conventional constant volume cycle (spark ignition) and a conventional constant pressure cycle (Diesel). The compression, heat addition and expansion phases of the mixed regenerative cycle of the present invention are shown by the segments AB, BCD and DE, respectively. For the constant volume cycle the compression, heat addition and expansion phases of this cycle are shown by segments AF, FG and GE. For the constant pressure cycle the compression, heat addition and expansion phases are shown by segments AF', F'H and HE. For the mixed regenerative cycle, heat addition occurs in two stages, namely, the stage identified by segment BC for regenerative preheating and the stage represented by the segment CD for fuel combustion.

Several advantages arise from the results shown in FIG. 10. Since heat energy is extracted from the exhaust gases and added to the compressed air charge, in addition to the heat energy added by the combustion of the fuel, the cycle efficiency is significantly improved over that of the constant volume cycle and the constant pressure cycle. It is also evident that the peak cylinder pressure is greatly reduced as shown in FIG. 10 for the regenerative cycle. This greatly reduces the mechanical stresses placed on the engine components, thus permitting a lighter engine construction. Also, the pressure fluctuations of regenerative cycle engine 10 is much less during the power stroke so that power is more smoothly delivered to the crank shaft. Fuel injection occurs at point C where the air charge temperature is much higher than for the other two cycles using fuel injection. This greatly facilitates the vaporization and ignition of the fuel and minimizes the ignition delay and partial fuel combustion problems that limit Diesel performance.

Figure 11:
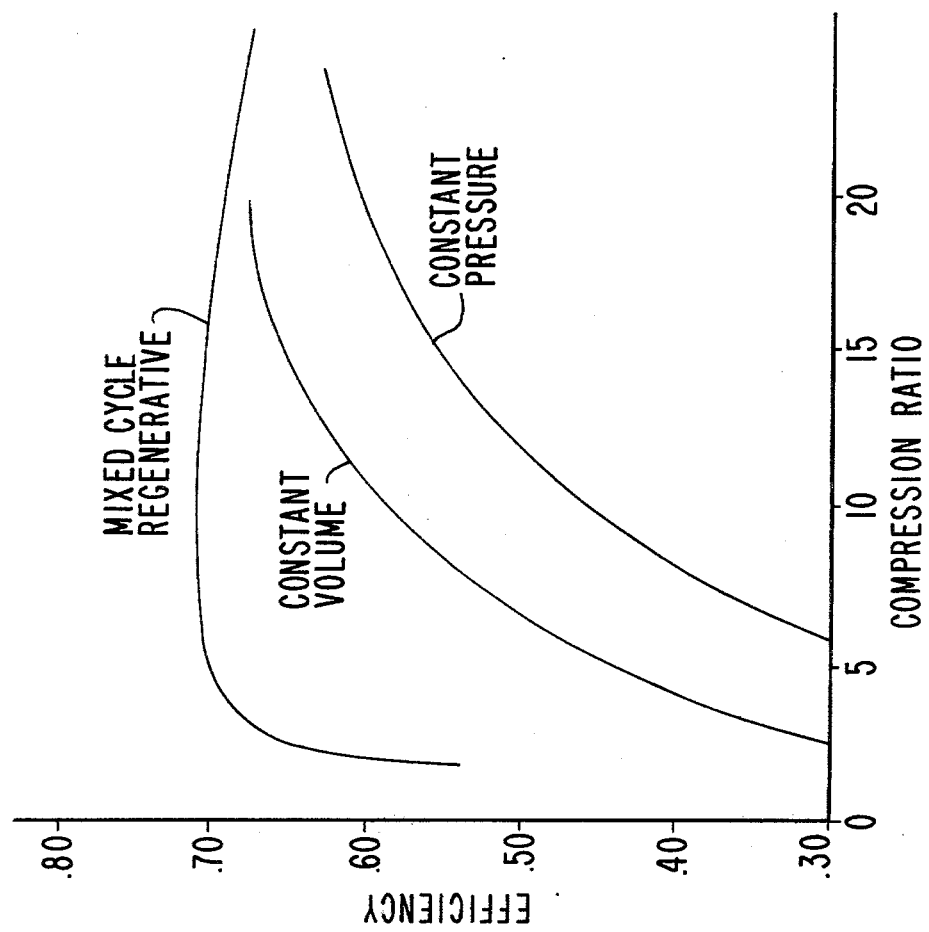
FIG. 11 is a graphic view of the efficiency-compression ratio relationship for the three cycles of operation shown in FIG. 10.

In addition to the foregoing, optimum performance of regenerative cycle engine 10 is achieved at a much lower compression ratio, approximately 5:1, than in the constant volume cycle engine and the constant pressure cycle engine. This is shown in FIG. 11. This feature allows greater freedom in engine design and permits adequate space for regenerator member 42. This low compression ratio allows for an engine design having a simplified side valve arrangement of the type described hereinafter with reference to FIG. 9. The lower compression ratio also means that the average heat path to the cylinder walls is increased, reducing heat loss to the engine and further increasing efficiency. The regenerator itself acts as a heat barrier during the power and exhaust strokes, further reducing heat loss to the engine cylinder head. While the graphical results shown in FIGS. 10 and 11 are based on idealized cycle analyses, the above advantages apply as well to real cycles.

Regenerator member 42 must be able to withstand the high exhaust gas temperatures to which it is subjected while it is in an oxidizing atmosphere. However, the mechanical stresses it is subjected to are minimal since it is not a part of the power train and supports no pressure difference. Many refractory materials and configurations, including those developed for heat exchangers and closed cycle (Sterling) and rotary (turbine) engines may be used. These include sintered or encased layers of metal screen or ceramic fibers, an encased volume of balls, corrugated and sintered metal, or ceramic strips or other configurations commonly used in heat exchangers.

In engine 10, regenerator member 42 reciprocates within cylinder 16 during the various stages of the operating cycle of the engine. This motion may be provided by firmly attaching the regenerator member to a narrow shaft that penetrates the cylinder head and is operated by a cam and spring arrangement similar to that commonly used to operate poppet valves. The cam may be on the same shaft as the valve cams or, due to the long stroke, may have a separate shaft. Alternately, any other means known in the art for moving a piston within the cylinder can be adopted to articulate the regenerator member.

Figure 8:
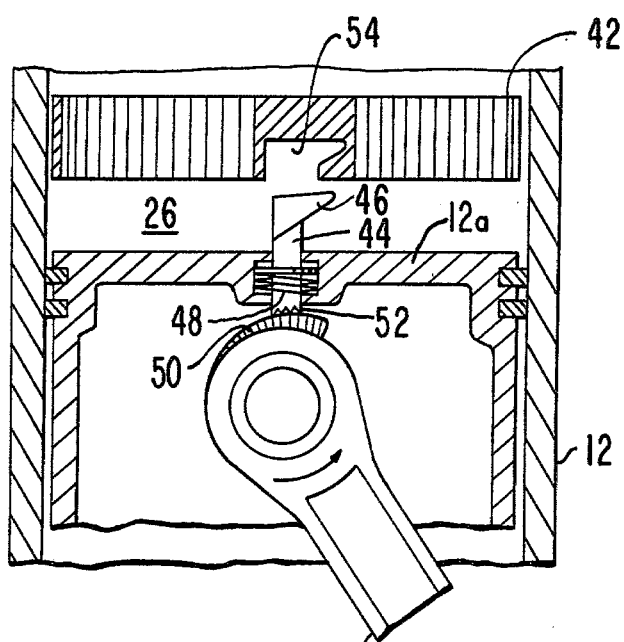
FIG. 8 shows a connector for releasably coupling the regenerator member to the piston for certain strokes of the operating cycle of the engine.

A particular way of articulating regenerator member 42 is shown in FIG. 8 and takes advantage of the fact that the regenerator member follows the motion of the piston for two strokes of the cycle and then remains at the top of the cylinder adjacent to the valves for the other two strokes. In this arrangement, piston 12 has a stub shaft 44 carried for reciprocation on the top wall 12a of piston 12. The shaft extends through wall 12a so that it projects into a portion of space 26. A pawl 46 is on the upper end of shaft 44, the opposite end of the shaft being biased by a coil spring 48 toward a cam 50 carried on the upper end of connecting rod 14. The lowermost end face of shaft 44 and a raised side of the cam 50 are provided with meshing teeth denoted by the numeral 52 so that, as connecting rod 14 pivots during the cycle of operation of the engine 10, pawl 46 is rotated and alternately raised and lowered.

Regenerator member 42 has a lower recess 54 shaped to releasably receive and retain pawl 46 in coupled relationship to member 42. Recess 54 is shaped so that, upon rotation of pawl 46 through the proper angle, the pawl becomes uncoupled with member 42 and the member can shift relative to piston 12.

The operation of the assembly of FIG. 8 is as follows: During the exhaust stroke, regenerator member 42 is at the top of the cylinder as shown in FIG. 2. While the piston is at or near top dead center, the exhaust and intake valves are closed and hold regenerator member 42 against further upward movement and in a position to be latched by pawl 46. As the piston passes through top dead center, connecting rod 14 rotates to cause rotation of cam 50 thereby to raise and rotate pawl 46 by virtue of the intermeshing teeth 52 to cause the pawl to enter recess 54 and to be rotated therein so as to become coupled to regenerator member 42.

During the intake stroke, the latched regenerator member 42 is moved downwardly with the piston as shown in FIG. 3. At the bottom of the stroke, the rotation of the connecting rod releases the pawl from regenerator member 42. During the compression stroke (FIG. 4) the piston pushes member 42 to the top of cylinder 16. As member 42 approaches the top of the cylinder, the compressed air charge passes through it and is heated (FIG. 5). The regenerator remains at the top of the cylinder during fuel injection (FIG. 6) and during the power and exhaust strokes (FIGS. 7 and 2). The cycle is then repeated.

Figure 9A:
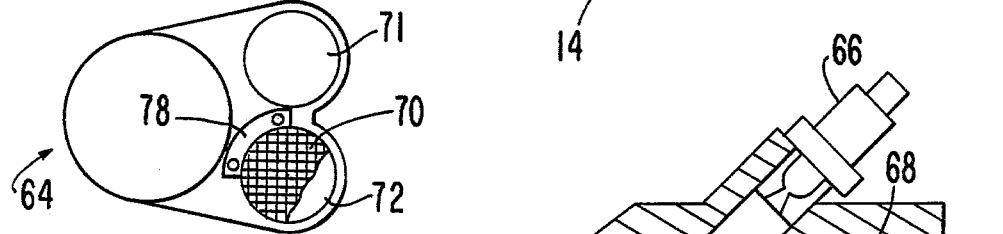
FIG. 9a is a top plan view in schematic form of the embodiment of the engine of FIG. 9.
Figure 9:
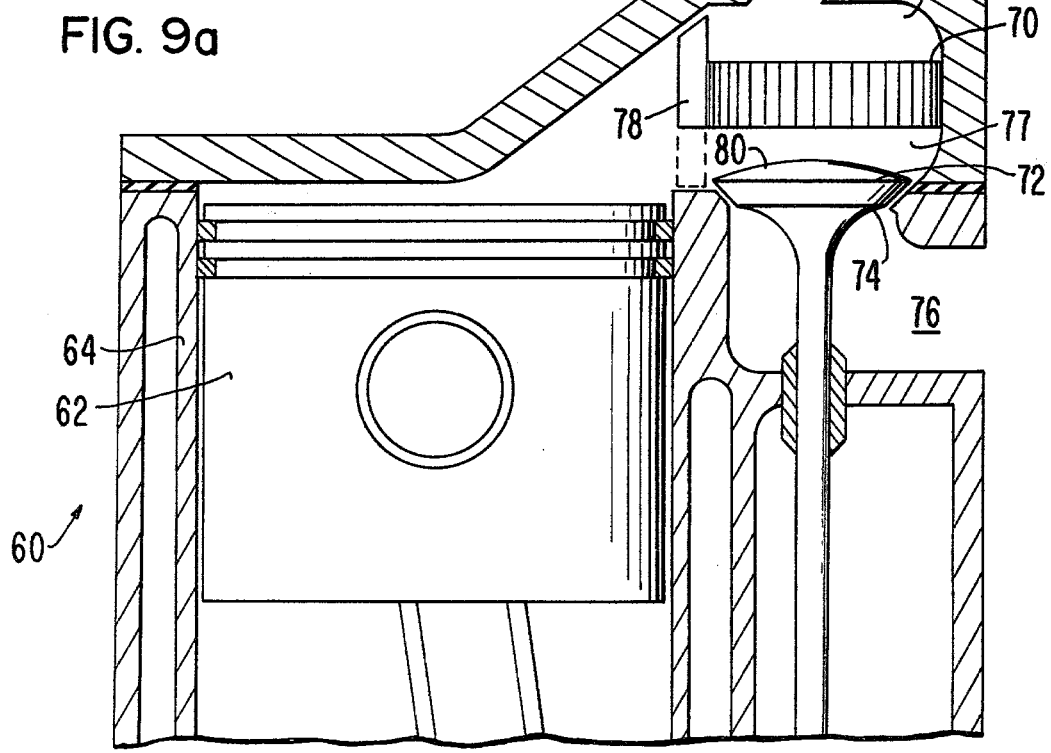
FIG. 9 is a view similar to FIG. 1 but showing a second embodiment of the regenerative cycle engine of the present invention.

FIGS. 9 and 9a show an alternate embodiment of the regenerative cycle engine which takes advantage of the low compression ratio to provide a low profile side valve engine 60. In engine 60, there is a piston 62 reciprocal in a cylinder 64 and a fuel injector 66 near an upper region 68 at the upper end of the cylinder chamber on one side of a fixed regenerative member 70 of the same type and construction as member 42 of engine 10. Member 70 is spaced above and covers intake valve 71 and an exhaust valve 72 between upper region 68 and a lower region 77, valve 72 covering an exhaust port 74 communicating with an exhaust passage 76.

A movable, curved dam or gate 78 is shiftably mounted in any suitable manner, such as by pins 79, at the side of spaces 68 and 77 for up and down movement relative to member 70. Dam 78 partially surrounds regenerative member 70 as shown in FIG. 9a. FIG. 9 shows the dam in the up position and the dashed lines represent the lowered position of the dam. The dam is provided to control exhaust air and compression air flow through regenerator member 70.

The operation of engine 60 is as follows: During the exhaust stroke, the dam is in its lowered position so that the hot exhaust gases pass from the main part of the cylinder into space 68 and then downwardly through regenerator member 70, heating it to a high temperature. The dam is then raised to its upper position so that during the compression stroke, the air charge is compressed in the space 77 beneath regenerator member 70. The dam is now lowered and during the expansion stroke, the compressed air charge passes through the regenerator member 70, preheating the air charge to a high temperature. Fuel is then injected into the hot air charge to provide the power stroke and to complete the cycle. Alternately, if a carburetted engine design is used, the fuel-air mixture will be ignited on passing through the regenerator member to provide the power stroke.

The dam can be activated by a connecting shaft or stem driven by a cam on the cam shaft or by any other appropriate means. A variation of this embodiment would have the regenerator member 70 move through an appropriate cycle to provide an optimized control of air charge flow through the regenerator member. This configuration is also applicable to a uniflow two-stroke engine design. The intake valve 71 is replaced by air induction slots in the lower part of the cylinder but the operation remains as described above.

A further modification of the basic regenerative engine cycle described above will allow the efficient combustion of low grade fuels. In this modification, the fuel is injected at the end of the exhaust stroke, FIG. 2, between the piston 12 and regenerator member 42. During the intake and compression strokes, this injected fuel remains confined in the small region between the piston head and the hot lower part of the regenerator so that substantial time and heat are provided to vaporize the fuel. At the end of the compression stroke and during the power stroke, pre-heated air passes through the regenerator member to mix with the vaporized fuel charge and efficient, complete combustion is initiated.

I claim:

1. In an internal combustion engine having an exhaust stroke, an intake stroke, and a compression stroke:

means defining a cylinder having an air intake port and an exhaust gas port; a piston moveable in the cylinder; reciprocal intake and exhaust valves moveable into and out of closing relationship with the intake and exhaust ports, respectively, whereby exhaust gases can exit from the cylinder during the exhaust stroke, intake air can enter the cylinder during the intake stroke, and compression of the air can occur during the compression stroke; a porous, heat retaining regenerator member between the piston and said valves; and means shiftably mounted in the cylinder for placing the regenerator in the path of the exhaust gases during the exhaust stroke and in the path of the intake air during the compression stroke, whereby the exhaust gases will heat the regenerator member during the exhaust stroke and the regenerator member will heat the compression air during the compression stroke.

2. In an engine as set forth in claim 1, wherein said placing means is moved as a function of the position of the piston in the cylinder.

3. In an engine as set forth in claim 1, wherein said regenerator member is shiftably mounted in the cylinder, said placing means being carried by the piston and having means for releasably coupling the piston to the regenerator member.

4. In an engine as set forth in claim 1, wherein said regenerator member has a plurality of fluid passages therethrough, said passages extending longitudinally of the path of travel of said piston in the cylinder.

5. In an engine as set forth in claim 1, wherein the piston has a connecting rod for coupling the piston to a crank shaft, said placing means including a stub shaft having a first end engageable with the connecting rod and shiftable relative to the piston as a function of the pivotal movement of the connecting rod relative to the piston, and means on the opposite end of the stub shaft for releasably coupling the stub shaft to the regenerator member as a function of the angular position of the connecting rod relative to the piston.

6. In an engine as set forth in claim 5, wherein the connecting rod has a cam on the end thereof coupled to the piston, the adjacent end of the stub shaft and the cam having intermeshing teeth for causing rotation of the stub shaft as the stub shaft is reciprocated relative to the piston.

7. An engine as set forth in claim 1, wherein the valves are in line with the path of movement of the piston, said regenerator member being moveable into a position adjacent to and covering the valves, the regenerator having an outer diameter substantially equal to the inner diameter of the cylinder.

8. An engine as set forth in claim 1, wherein the cylinder has said valves at locations to the side of the path of travel of the piston, said cylinder having a portion between the piston and valve, said regenerator member being in a position in said cylinder portion to present a pair of regions on opposite sides of said member, said placing means comprising a shiftable dam for movement alternately into positions blocking fluid communication between the remaining portion of the cylinder and said regions, respectively.

9. An engine as set forth in claim 8, wherein the dam at least partially surrounds the regenerator member.

10. An engine as set forth in claim 8, wherein the fuel is injected into a space in the cylinder on the combustion chamber side of the regenerator member near the end of the exhaust cycle, said fuel being confined to said space and maintained in contact with exhaust gases during subsequent intake and compression cycles so that substantial heat and time are provided to vaporize and disperse said injected fuel.

11. An engine as set forth in claim 1, wherein the fuel is injected between the piston and the regenerator member near the end of the exhaust stroke, said fuel being confined between the piston and regenerator member and maintained in contact with exhaust gases during the subsequent intake and compression strokes so that substantial heat and time are provided to vaporize and disperse said injected fuel, compressed air being drawn through the regenerator member to be mixed with said fuel and provide for combustion and the power stroke.

12. In a method of operating an internal combustion engine having a cylinder, a moveable piston in the cylinder, and intake and exhaust valves comprising: providing a heat storage and exchange region in the cylinder with said region being shiftably mounted in the cylinder for movement relative to the piston; directing the exhaust gases in the cylinder in one direction through said region during the exhaust cycle of the engine and when the region is at a first position in the cylinder to cause the storage of heat in the region; drawing fresh combustion air into the cylinder when the region is at a second position in the cylinder; passing the fresh air in the opposite direction through said region in heat exchange relationship to the heat energy stored thereby to heat the fresh air as the region moves from said second position to said first position; injecting a combustible fuel into the cylinder between the piston and the region in mixing relationship to the preheated combustion air; and igniting the fuel-air mixture.

13. A method as set forth in claim 12, wherein is included the step of moving the region to a location adjacent to the exhaust valve during the exhaust stroke of the engine.

14. A method as set forth in claim 13, wherein the region is moved as a function of the movement of the piston.

15. A method as set forth in claim 12, wherein the region is stationary in the cylinder, said heating step including gating the exhaust gases from one part of the cylinder, through the region to another part of the cylinder, said passing of the air comprised directing the compression air from the other part of the cylinder to said one part thereof.

16. A method as set forth in claim 12 wherein said engine has an exhaust stroke, an intake stroke, a compression stroke and a power stroke, said injecting step includes injecting the fuel in the space between the piston and said region during the exhaust stroke, and confining the injected fuel in said space during the intake and compression strokes, said passing step occuring during the power stroke.

17. In a method of operating an internal combustion engine having a cylinder, a moveable piston in the cylinder, a heat storage and exchange regenerator member shiftably mounted in the cylinder for movement relative to the piston, and intake and exhaust valves comprising: passing the exhaust gases in one direction through said regenerator member in the cylinder during the exhaust cycle of the engine and when the regenerator member is in a first position in the cylinder to heat the regenerator member; drawing an air/fuel mixture into the cylinder; passing at least a major portion of the air/fuel mixture in the opposite direction through said regenerator member during the latter part of the compression cycle and when said regenerator member is in a second position in the cylinder to heat the air/fuel mixture; and igniting the air/fuel mixture.

18. In a method of operating an internal combustion engine having a cylinder, a moveable piston in the cylinder, and intake and exhaust valves comprising: providing a heat storage and exchange region in the cylinder; gating the exhaust gases from a first part of the cylinder, through the region and into a second part of the cylinder to cause storage of the heat energy from the exhaust gases in the region during the exhaust cycle of the engine; drawing fresh combustion air into the cylinder; compressing the air in said second part; gating the compressed air in said second part and causing the compressed air to pass through said region and into said first part to heat the air during the intake cycle of the engine; injecting a combustible fuel into the cylinder in mixing relationship to the preheated combustion air; and igniting the fuel-air mixture.

* * * * *